Sept. 16, 1958 W. T. HOLLOWAY 2,852,125
APPARATUS AUXILIARY TO THE REMOVING
OF TINNED BREAD FROM TINS
Filed Jan. 16, 1956 3 Sheets-Sheet 2
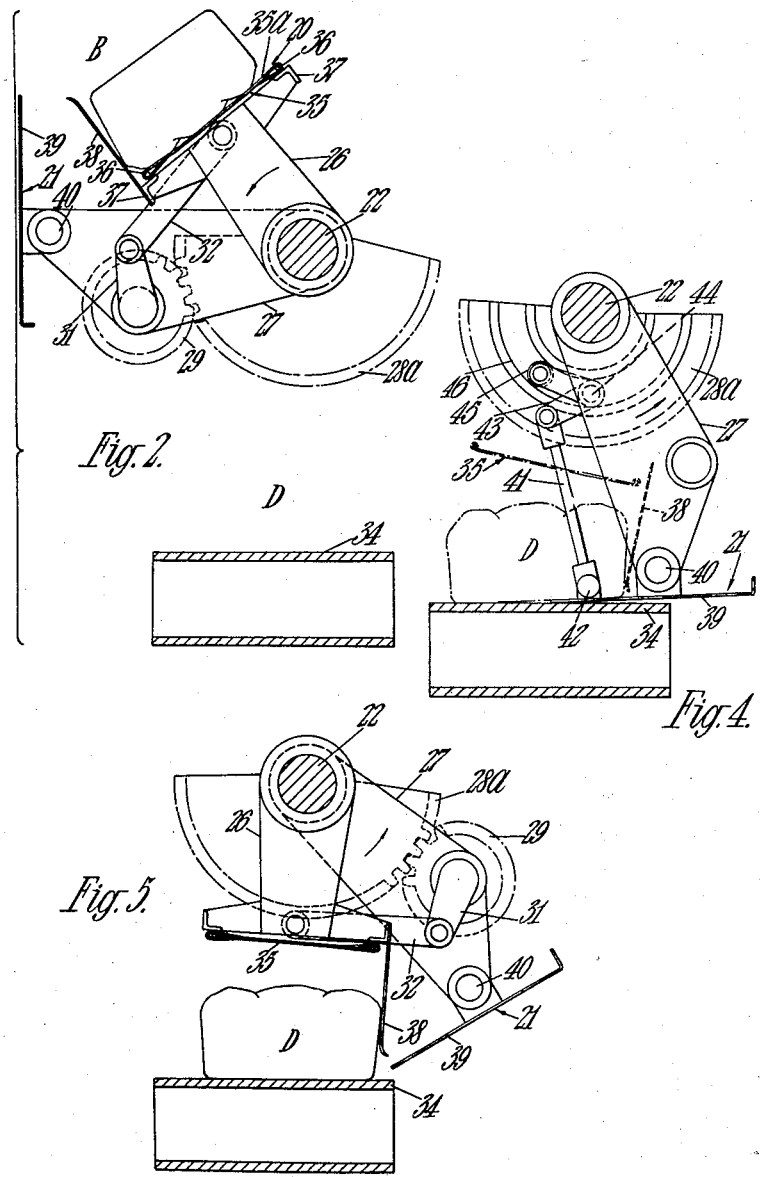
Inventor
William Thomas Holloway
By Fearman & Fearman
Attorneys Sept. 16, 1958   W. T. HOLLOWAY   2,852,125
APPARATUS AUXILIARY TO THE REMOVING
OF TINNED BREAD FROM TINS
Filed Jan. 16, 1956   3 Sheets-Sheet 3
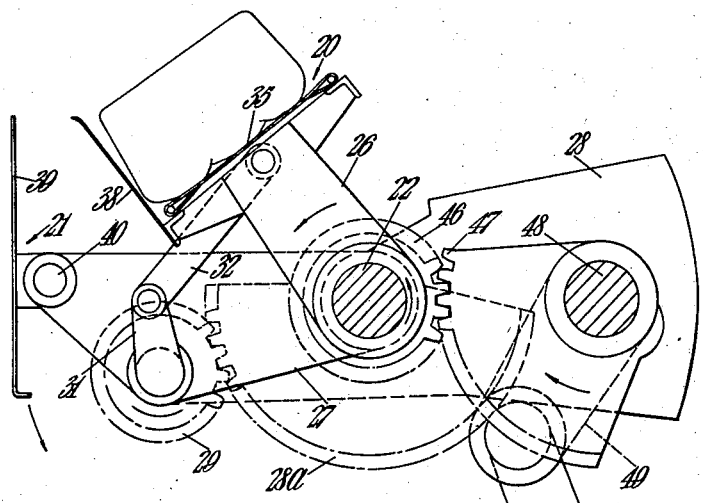
Fig.6.
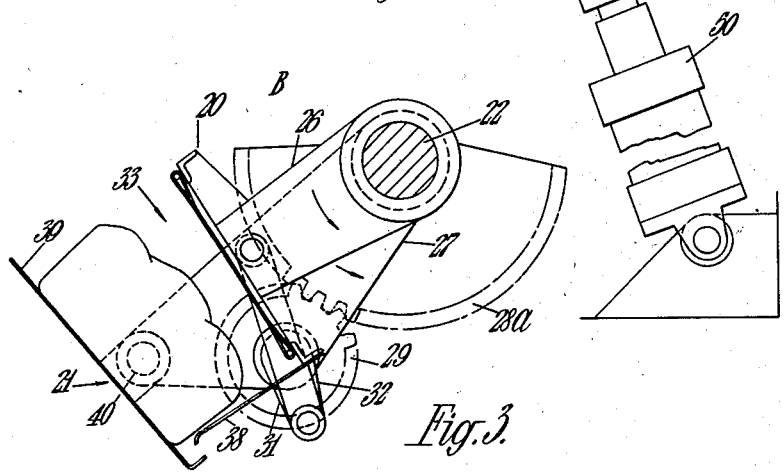
Fig.3.
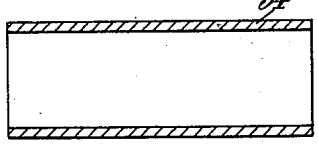
Inventor.
William Thomas Holloway.
By Fearman & Fearman.
Attorneys United States Patent Office 2,852,125
Patented Sept. 16, 1958

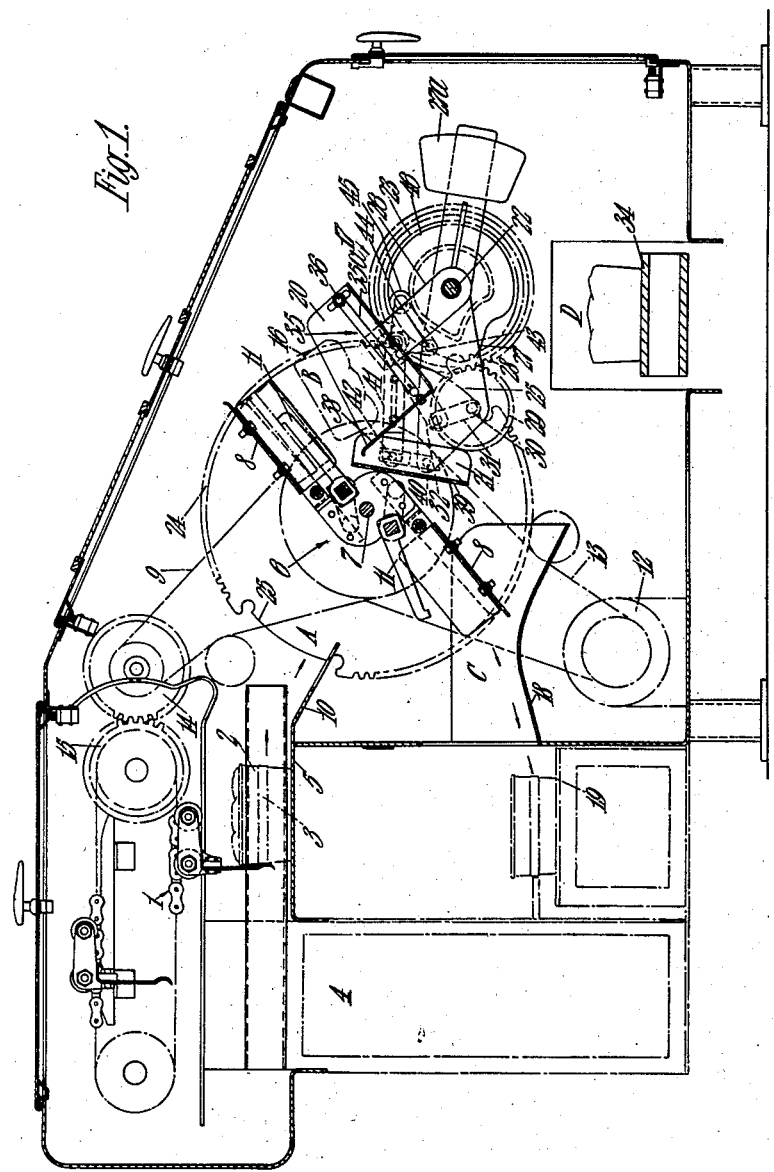

2,852,125

APPARATUS AUXILIARY TO THE REMOVING OF TINNED BREAD FROM TINS

William T. Holloway, Peterborough, Northampton, England, assignor to Baker Perkins Incorporated, Saginaw, Mich.

Application January 16, 1956, Serial No. 559,443

Claims priority, application Great Britain January 21, 1955

17 Claims. (Cl. 198—33)

This invention relates to apparatus for use with mechanism for removing tin bread from tins, usually termed detinning machines, of the type in which bread tins are inverted or partly inverted so that their contents are discharged in an inverted or part inverted position, the apparatus, the subject of the present invention, being particularly concerned with the receiving of loaves discharged in this manner and the transfer of such to conveyor or other surface receiving means accompanied by a righting of the loaves.

The apparatus, according to the present invention, may be conveniently applied to rotary detinning machines, such as described in British patent specification No. 681,605, or to linear conveyor types of detinning machines, such as described in British patent specification No. 672,990 or No. 546,652.

Gravity controlled loaf righting means are shown in the specification of the Patent No. 672,990, wherein the loaves discharged from the inverted tins first strike a static turning bar to land right way up in a trough, the side of which is then lowered to form a ramp down to a conveyor or other receiving surface means; in the specification of Patent No. 681,605 the inverted loaves are partly righted as they fall by static turning means and are then received on a counter-balanced pivotal shelf which tilts under the weight of the loaves and deposits the loaves fully righted on an adjacent conveyor or other surface receiving means. While both these methods of transferring and righting loaves as they are discharged from the inverted tins are satisfactory, particularly where the bakery in which they are employed does not comprise a largely or fully automatic bread plant with consequent necessity for accurate timing, such righting and transfer apparatus does not always function accurately, chiefly due to irregularities in the loaves, so that where it is is required to employ a detinning machine of the type indicated in a largely or fully automatic plant circuit, it is preferable to have more positive control of the loaves as they are ejected from the tins. Further the position of the static turning bar or other fixed means for assisting the righting of the loaves is critical for different sizes of loaves, for example a detinning machine may have to handle strapped groups of 2 lb. loaf tins arranged in a single row with the longer axes of the tins parallel to the direction of feed, or strapped groups of 1 lb. loaf tins arranged in double rows with the longer axes of the tins at right angles to the direction of feed, so that the same static turning means would not be correctly positioned in the discharge path of both sizes of loaf.

It is an object of the present invention to provide improved means for receiving loaves discharged in an inverted or partly inverted position from a detinning machine and for transferring them to a conveyor or other surface receiving means while at the same time righting the loaves.

It is a further object of the present invention to provide improved loaf transfer and righting means, according to the preceding paragraph, wherein the operation of such means is positively controlled at all times and can be synchronised with the sequence timing of an automatic bread production plant.

It is a still further object of the present invention to provide improved bread transfer and righting means, according to either of the preceding paragraphs, which control the detinned loaves of bread such that during transfer of the loaves to a conveyor or other surface receiving means bouncing or other uncontrolled movement of the loaves is reduced to a minimum.

It is a still further object of the present invention to provide improved loaf transfer and righting means, according to either of the preceding paragraphs, which control the detinned loaves of bread such that during transfer of the loaves to a conveyor or other surface receiving means bouncing or other uncontrolled movement of the loaves is reduced to a minimum.

It is a still further object of the present invention to provide improved loaf transfer and righting means, according to any of the three preceding paragraphs which will receive different sizes of loaves from the detinning machine and right and transfer them correctly.

The invention consists in apparatus of the type indicated for transferring the contents of containers, more particularly loaves from bread tins, wherein the loaves from inverted or partly inverted bread tins are received in a catcher device mounted for orbital movement about an axis and co-operating with a transfer device also mounted for orbital movement about the same or a parallel axis, the catcher device firstly being located clear of the transfer device until the loaves are received thereon, whereafter the catcher device and the transfer device are relatively moved in orbit and brought together so that the loaves are contained between the two devices, followed by the two devices moving in orbit substantially together until the catcher device is inverted and the loaves are supported horizontally solely on the transfer device, the orbital movement of the catcher device and transfer device together then ceasing being replaced by a relative movement between the two devices so that the loaf supporting function of the transfer device is eliminated due to the consequent relative movement between the loaves and the surface of the transfer device on which they were supported and the loaves transferred or deposited on a conveyor or other receiving means therebelow; means being provided on the catcher device to engage the loaves and form abutment means by which the said relative movement between the loaves and the said surface of the transfer device is imposed.

According to the present invention as set out in the preceding paragraph the catcher device, after receiving the loaves is moved in orbit from its position clear of the transfer device to a co-operating position with the transfer device so that the loaves are contained between the two devices and, after the orbital movement of the two devices together has brought the catcher device to its inverted position, the orbital movement of the catcher device is arrested and the continued orbital movement of the transfer device causes the surface thereof on which the loaves are supported to be withdrawn from beneath the loaves so that they are transferred or deposited on a conveyor or other receiving surface means therebelow, means being provided on the catcher device to prevent the loaves moving with the supporting surface of the transfer device when the latter continues its orbital movement after the catcher has stopped whereby the loaves are stripped from the transfer device supporting surface.

Further according to the present invention as set out in the preceding paragraphs, the catcher device comprises a one sided trough, the bottom of which receives the main impact of the loaves as they are discharged from the bread tins and the side of which supports the loaves initially during the orbital movement of the catcher device and finally acts as the above mentioned stripper device for preventing movement of the loaves with the transfer means after the orbital movement of the catcher device has temporarily stopped.

Still further according to the present invention as set out in either of the three preceding paragraphs the transfer device comprises surface means having a length substantially co-extensive with the trough of the catcher device and disposed in the first instance below the level of the receiving station of the catcher device and alongside the orbital path thereof, so that when the catcher device moves in its orbit it is brought into co-operation with the transfer device, the surface means of which forms with the side and bottom of the catcher device a trough in which the loaves first are supported on the side member of the catcher device and finally on the surface means of the transfer device as the orbital movement continues to invert the catcher device.

According to a preferred embodiment of the apparatus for transferring and righting loaves received from a detinning machine, according to the preceding paragraphs, the catcher device and the transfer device are carried on arms pivotal about a common axis parallel to that of a row of loaves discharged from the detinning machine. The catcher device and the transfer device may, however, have parallel but not common axes, the catcher device being pivoted on the transfer device arm at a point spaced from the transfer device pivotal axis.

Also according to a preferred form of the invention, the relative movements in orbit of the catcher device and transfer device, initially and during stripping of the loaves from the transfer device, is provided by means of a crank carried on the transfer device, the rotation of which is effected by a pinion in a planetary meshing relationship with a relatively fixed arcuate or circular series of gear teeth, e. g. a rack quadrant or a full spur gear, concentric with the axis of orbit of the transfer device whereby on orbital movement of the transfer device the pinion thereon is rotated due to its planetary relationship to the fixed teeth, the end of the crank being coupled to the catcher device by a link. By this arrangement the relative displacements of the catcher device and the transfer device follow a simple harmonic motion such that the two devices are initially brought speedily together, followed by movement together with no substantial relative movement, followed by a rapid separation of the devices to effect stripping of the loaves from the transfer device.

The drive by which the transfer device is caused to orbit and with it the catcher device may comprise a shaft to which the transfer device arm is secured (the catcher device being freely pivotal thereon) and means for rotating the shaft in timed relationship with the operation of the detinning machine. Alternatively the shaft may be fixed and the transfer device freely mounted thereon, drive means, such as a hydraulic or pneumatic cylinder device, being applied directly to the transfer device preferably through a lever arm extension thereof. One preferred embodiment of the transfer device orbital drive means, where the apparatus is associated with a detinning machine of the rotary type such as described in the aforementioned British patent specification No. 681,605, consists in a large diameter spur gear which is secured on an extension of the drive shaft of the detinning machine (i. e. the shaft around the axis of which the detinner platforms rotate to invert the tins) and meshing with a smaller gear wheel on the shaft mounting and driving the transfer device, so that as the detinner platforms are rotated the transfer device shaft is driven in timed relationship; in order, however, to allow the transfer device and, more particularly, the catcher device to dwell while receiving the loaves discharged from the tins on the detinner platforms, the large diameter gear wheel on the detinning machine shaft has the circumferential extent of its gear teeth interrupted over arcuate portions corresponding to the positions relative thereto of the detinner platforms whereby there is obtained a cessation of orbital drive to the transfer device and catcher device just prior to and during the discharge of the loaves from their tins and their arrival in the catcher device, whereafter the drive continues to effect righting and transfer of the loaves as described. With this drive arrangement the catcher and transfer devices have a full orbital travel.

In an alternative preferred embodiment of the transfer device orbital drive means, more particularly where the apparatus is associated with a linear conveyor type of detinning machine, such as described in the aforementioned British patent specification No. 672,990 or No. 546,652, the drive shaft for the transfer device may be caused to rotate (or the transfer device caused to be rotated on the shaft) by means of a hydraulic or pneumatic cylinder mechanism operated in synchronism with the detinning machine. The hydraulic or pneumatic mechanism may be coupled to a crank to rotate a segmental rack meshing with a pinion on the transfer device drive shaft, or be coupled direct to the transfer device when the latter is pivotally mounted on the shaft. With either of these alternative drive arrangements the catcher and transfer devices have a semi-rotary oscillatory travel.

In the accompanying drawings:

Figure 1 is a sectional side elevation of a detinning machine of the rotary type to which is applied loaf righting and transfer means according to the present invention, Figures 2 to 5 are somewhat diagrammatic side elevations of loaf righting and transfer means, according to the present invention, showing stages of operation, and Figure 6 is a somewhat diagrammatic side elevation of loaf righting and transfer means, according to the present invention, showing a drive arrangement alternative to that shown in Figure 1.

In carrying the invention into effect, according to one mode by way of example, the apparatus for righting detinned loaves and transferring them to a conveyor or other receiving surface will be described as applied to or incorporated in a detinning machine of the rotary type similar to that described, for example in the aforementioned British patent application No. 681,605.

The detinning machine, in its essentials (see Figure 1), consists in a pusher gear indicated at 1 for advancing bread tins 2, preferably grouped in rows as by straps 3 in known manner, from a conveyor (not shown) but locatable in space 4 over surfaces 5 towards the detinning mechanism indicated at 6. This mechanism comprises a driven shaft 7 on which is mounted, in this case, a pair of tin-receiving platforms 8 which are rotated by the shaft 7 in timed relationship with the pusher gear 1, see chain drive indicated at 9, so that the pusher gear 1 causes a row of tins to arrive at the loading point A at the appropriate moment as a platform 8 arrives thereat to receive the load of tins from the ramp 10. Clamping arms 11 are associated with each platform and come into operation as each row of tins is loaded on the platform 8 and hold the row in place preferably by engagement with the straps 3 of the tins. The detinning mechanism 6 is driven by a motor 12 via chain 13 and the drive for the pusher gear 1 is taken therefrom by the aforementioned chain drive 9 and meshing gears 14, 15.

The rotation of the detinning mechanism 6 about the axis of the shaft 7 causes the tins to become inverted and to discharge the loaves 16 therein (with the assistance of shock or vibration if necessary) at a first transfer point B into the loaf righting and transfer mechanism indicated at 17 to be described hereafter.

After discharge of the loaves, the rotation of the platforms 8 carries the still-clamped row of tins round to an empty tin-discharge point C, whereat the clamps 11 are released to allow the tins to slide off the platforms 8 down slope 18 and onto a tin discharge conveyor 19.

The loaf righting and transfer mechanism 17 comprises a loaf catcher device 20 and a loaf transfer device 21 mounted for orbital rotation about the common axis of a shaft 22. The transfer device 21 is secured to the shaft 22 to be rotated thereby, but the catcher device is rotatably mounted on the shaft 22. In one form of the invention, as shown in Figure 1, the shaft 22 is driven from the rotary detinning mechanism 6, a spur wheel 23 on the shaft 22 being in mesh with a large diameter modified spur wheel 24 on the shaft 7 of the detinning mechanism 6 so that as the latter rotates the shaft 22 is rotated in timed relationship therewith through the spur wheels 23 and 24. In order, however, to permit the transfer device 21 and, more particularly, the catcher device 20 to dwell while receiving the loaves discharged from the tins on the platforms 8 of the detinner mechanism 6 at station B, the large diameter spur wheel 24 has the circumferential extent of its gear teeth interrupted over arcuate portions 25 corresponding to the positions relative thereto of the platforms 8. By this arrangement, although the shaft 7 and large diameter spur wheel 24 of the detinner machine 6 rotates continuously there is a cessation of drive to the spur wheel 23 of the loaf righting and transfer mechanism 17 for a period sufficient to allow the loaves to be received at station B by the catcher device 20 while the latter is stationary. The drive arrangement shown in Figure 1, the catcher device 20 and transfer device 21 have a full 360° orbital travel, which is completed twice for each rotation of the detinner mechanism 6. A drive mechanism independent of the detinner mechanism (of whatever type) and effecting only semi-rotation (oscillation) of the catcher and transfer devices is described with reference to Figure 6 hereafter.

The further mechanism and operation of the loaf righting and transfer mechanism 17 will now be described with reference to Figure 1 and Figures 2 to 5. The catcher device 20 is carried freely on the shaft 22 on an arm 26 and the transfer device 21 on an arm 27 secured to the shaft 7 and provided with a counterweight 27a (not shown in Figures 2 to 5). Fixed on the framework of the machine, adjacent the plane in which the transfer device arm 27 rotates is a fixed toothed wheel 28 or quadrant 28a (see Figures 2 to 6) and pivotally secured to the transfer device arm 27 is a planet gear 29 the teeth of which mesh with those of the wheel 28 or quadrant 28a, so that as the transfer device arm 27 is caused to rotate about its axis (that of the shaft 22) the planet gear 29 is caused to rotate about its pivotal shaft 30 at a predetermined speed according to the ratio between it and the fixed wheel 28 or quadrant 28a. Secured to the shaft 30 of the planet gear 29 is a short crank 31 from the end of which a connecting rod 32 extends to the catcher device arm 26 so that as the planet gear 29 rotates, with movement of the transfer device arm 27, the planet gear crank 31 and the connecting rod 32 draws down the catcher device 20 at an overtaking speed with respect to the orbital movement of the transfer device 21, so that, during the first part of the transfer movement (see Figure 3), the crank 31 moves towards its top dead centre position 20 relatively to the connecting rod 32 and the catcher device 20 and transfer device 21 are brought together to co-operate and form a trough 33 in which the loaf is contained. As the transfer device arm 27 swings further along its orbital path, it moves the transfer device 21 and accompanying catcher device 20 onwards towards the position (see Figure 4) in which the transfer device arm 27 is substantially vertical, the rotation of the planet gear 29 about the wheel 28 or quadrant 28a causing the connecting rod 32 to leave the top dead centre position so that, although movement of the transfer device 21 continues, the movement of the catcher device 20 is retarded, so that orbital movement of the catcher device 20, after slowing up, substantially ceases, with the result that the transfer device 21 draws away from the catcher device 20 while the latter prevents movement of the loaves on the transfer device 20 from continuing movement therewith (see Figures 4 and 5) so that the loaves are stripped therefrom at the second transfer station D and deposited on a closely adjacent receiving surface, such as a conveyor 34. In Figure 4 certain details of the catcher device 20, shown in Figures 2, 3 and 5, are omitted to show more clearly the level maintaining mechanism, described hereafter, for the transfer device 21.

The catcher device 20 in structure comprises an elongated one-sided trough, the bottom 34 of which receives the main impact of the loaves as they are discharged from the bread tins at the first transfer station B. For this reason the bottom 34 is formed by a textile or other suitable apron 35 carried stretched between side rods 36 mounted on the frame 37 of the catcher device. The apron 35 serves to reduce rebound and the tendency of the loaves to roll over due to non-uniform crust formation by conforming partially at least to the shape of the crust, the liability of the loaf crusts to damage is also greatly reduced. The side 38 of the catcher device 20 is co-extensive with the bottom 34 and serves initially (see Figure 2) to support the loaves during the coming-together of the catcher device 20 and transfer device 21 and finally acts (see Figures 4 and 5) to strip the loaves from the inverted transfer device 21, as mentioned above, by preventing movement of the loaves with the transfer device as its travel continues after the orbital movement of the catcher device has temporarily stopped.

The transfer device 21 simply comprises a surface 39 which with the bottom 34 and side 38 of the catcher device 20 forms the previously mentioned trough 33 (see Figure 3) and from which the loaves are stripped (see Figures 4 and 5) at the second transfer station D by the side wall 38 of the catcher device.

In order to ensure smooth transfer of the loaves from the surface 39 of the transfer device 21 to the conveyor 34, it is desirable that during transfer the surface 39 of the transfer device 21 on which the loaves are being supported is maintained as near horizontal as possible in spite of the actual orbital movement of the transfer device 21 which tends to maintain the surface 39 thereof substantially tangential to its orbit. To this end the transfer device 21 is pivotally mounted at 40 on the end of its arm 27 but its pivoting is restrained and controlled by a link 41 (see Figure 1 and diagrammatically in Figure 4) connected at one end to the transfer device surface 39 at a point 42 displaced from its pivotal mounting 40 on its arm, and at the other end to a bell crank lever 43 pivoted at 44 on the arm 27 and carrying a cam following roll 45 engaged in an arcuate or circular box cam 46 in a fixed part of the machine, for example on the fixed toothed wheel 28 or quadrant 28a, the action of the cam 46 being such as to apply to the transfer device 21, through said linkage, 41, 43 a tilting action as it approaches and passes through the second transfer station D, which neutralizes the orbital tilting so that the surface 39 of the transfer device 21 is maintained in substantial horizontality during transfer.

An alternative drive for the loaf righting and transfer mechanism 17 is shown in Figure 6, in which the mechanism is not driven from the detinning mechanism 6 as in the case of the machine shown in Figure 1, but has independent actuating means. Such actuating means, however, is controlled by the detinning mechanism in order to obtain the necessary synchronism. The independent actuating means may therefore comprise a pinion 46 in the shaft 22 of the transfer device 21 (similar to the spur wheel 23 of Figure 1) in engagement with a rack quadrant 47 pivotally mounted on a shaft 48. A crank 49 also on shaft 48 is coupled to a hydraulic or pneumatic cylinder device or ram 50, such that when the ram 50 is operated in synchronism with the detinner mechanism, the quadrant 47 rotates the shaft 22 through the pinion 46. The drive in this arrangement results in a semi-rotary oscillatory movement of the loaf righting and transfer mechanism 17 and for this reason the return stroke of the mechanism 17 is delayed until the row of loaves deposited on the conveyor 34 have been moved clear.

It is preferable that the loaves being discharged from the detinning mechanism 6 follow a path which is tangential to their previous arcuate path which they followed during their inverting and ejecting movement as in the arrangement shown in Figure 1; the invention may however be applied to machines where such is not the case e. g. to the detinning machine disclosed in the aforementioned British patent specification No. 672,990. Tangential discharge appears to assist the discharge of the loaves from the tins so that shock or vibration is not required to loosen the loaves; air-blast means may however be provided at or near the point of ejection according to our British Patent No. 546,652 in case a batch of loaves has an unusual tendency to stick.

As an alternative (not shown) to the relative motions of the catcher device and the transfer device described above, the transfer device may, after the loaves have been received by the catcher device, move first into a co-operating position with the catcher device before the latter (together with the transfer device) starts orbital movement. A further alternative (also not shown) may comprise causing the transfer device to stop in its inverted (transfer) position, rather than continue its orbital movement, the catcher device (also inverted) commencing a retrograde orbital movement to effect the desired relative movement between the two devices so that the loaves are slid off the surface of the stationary transfer device on which they are supported.

I claim:

1. Apparatus of the type indicated for transferring the contents of containers, more particularly loaves from bread tins, wherein the loaves from inverted or partly inverted bread tins are received in a catcher device mounted for orbital movement about an axis and co-operating with a transfer device also mounted for orbital movement about an axis, the catcher device firstly being located clear of the transfer device until the loaves are received thereon, whereafter the catcher device and the transfer device are relatively moved in orbit and brought together so that the loaves are contained between the two devices, followed by the two devices moving in orbit substantially together until the catcher device is inverted and the loaves are supported horizontally solely on the transfer device, the orbital movement of the catcher device and transfer device together then ceasing being replaced by a relative movement between the two devices so that the loaf supporting function of the transfer device is eliminated due to the consequent relative movement between the loaves and the surface of the transfer device on which they were supported and the loaves transferred or deposited on a conveyor or other receiving means therebelow; means being provided on the catcher device to engage the loaves and form abutment means by which the said relative movement between the loaves and the said surface of the transfer device is imposed.

2. Apparatus as claimed in claim 1, wherein the catcher device after receiving the loaves is moved in orbit from its position clear of the transfer device to a co-operating position with the transfer device so that the loaves are contained between the two devices and, after the orbital movement of the two devices together has brought the catcher device to its inverted position, the orbital movement of the catcher device is arrested and the continued orbital movement of the transfer device causes the surface thereof on which the loaves are supported to be withdrawn from beneath the loaves so that they are transferred or deposited on a conveyor or other receiving surface means therebelow, means being provided on the catcher device to prevent the loaves moving with the supporting surface of the transfer device when the latter continues its orbital movement after the catcher has stopped whereby the loaves are stripped from the transfer device supporting surface.

3. Apparatus as claimed in claim 2, wherein the catcher device comprises a one sided trough, the bottom of which receives the main impact of the loaves as they are discharged from the bread tins and the side of which supports the loaves initially during the orbital movement of the catcher device and finally acts as the above mentioned stripper device for preventing movement of the loaves with the transfer means after the orbital movement of the catcher device has temporarily stopped.

4. Apparatus as claimed in claim 3, wherein the bottom of the catcher device comprises a stretched apron of textile or similar material.

5. Apparatus as claimed in claim 3, wherein the transfer device comprises surface means having a length substantially co-extensive with the trough of the catcher device and disposed in the first instance below the level of the receiving station of the catcher device and alongside the orbital path thereof, so that when the catcher device moves in its orbit it is brought into cooperation with the transfer device, the surface means of which forms with the side and bottom of the catcher device a trough in which the loaves first are supported on the side member of the catcher device and finally on the surface means of the transfer device as the orbital movement continues to invert the catcher device.

6. Apparatus as claimed in claim 5, wherein the catcher device and the transfer device are carried on arms pivotal about a common axis parallel to that of a row of loaves discharged from the detinning machine.

7. Apparatus as claimed in claim 5, wherein the catcher device and the transfer device are carried on arms pivotal about parallel but not common axes, the catcher device being pivoted on the transfer device arm at a point spaced from the transfer device pivotal axis.

8. Apparatus as claimed in claim 2, wherein the relative movements in orbit of the catcher device and transfer device, initially and during stripping of the loaves from the transfer device, is provided by means of a crank carried on the transfer device, the rotation of which is effected by a pinion in a planetary meshing relationship with a relatively fixed arcuate series of gear teeth concentric with the axis of orbit of the transfer device whereby on orbital movement of the transfer device the pinion thereon is rotated due to its planetary relationship to the fixed teeth, the end of the crank being coupled to the catcher device by a link.

9. Apparatus as claimed in claim 2, wherein the drive by which the transfer device is caused to orbit, and with it the catcher device, comprises a shaft to which the transfer device is secured and on which the catcher device is freely pivotal, and means for rotating the shaft in timed relationship with the operation of the detinning machine.

10. Apparatus as claimed in claim 2, wherein the shaft mounting the transfer device is fixed and the transfer device freely pivotal thereon, and including fluid pressure drive means being applied directly to the transfer device.

11. Apparatus as claimed in claim 10, wherein the fluid pressure drive means is coupled to a crank to rotate a segmental rack meshing with a pinion on the transfer device drive shaft.

12. Apparatus as claimed in claim 2, wherein the transfer device has level controlling means associated therewith adapted to maintain its surface substantially horizontal during transfer of the loaves therefrom and while the transfer device is still moving in orbit.

13. Apparatus as claimed in claim 12, wherein the transfer device is pivotally mounted on the ends of supporting arms on an axis parallel with and spaced from the axis of orbital movement and the level controlling means comprise link means for restraining and controlling the pivotal movement of the transfer device, said link means being connected at one end to the transfer device at a point spaced from the pivotal mounting thereof to its supporting arms and at its other end to cam operated means adapted on continued orbital movement of the transfer device during the period of the transfer of loaves therefrom to cause the transfer device to pivot on the ends of its supporting arms in relation to its orbital movement whereby its horizontality is substantially maintained.

14. Apparatus for receiving bread loaves in inverted position from a detinning machine and discharging the loaves in upright position to a conveyer, said apparatus comprising a catcher device for receiving inverted loaves from said machine; means mounting said catcher device for movements in an orbital path; a transfer device; means mounting said transfer device for movements in an orbital path; driving means connected to said devices for moving them in their said paths in unison to such positions that bread loaves are transferred from said catcher device to said transfer device in upright position, said driving means including means for imparting relative movement to said devices when said devices are in said positions; and means forming part of said catcher device for supporting bread loaves during their transfer to said transfer device and for stripping bread loaves from said transfer device upon said relative movement of said devices.

15. Apparatus for receiving bread loaves in inverted position from a detinning machine and discharging the loaves in upright position to a conveyer, said apparatus comprising a catcher device for receiving inverted loaves from said machine, said catcher device having a main impact receiving surface and a supporting surface extending therefrom; means mounting said catcher device for movements in an orbital path; a transfer device having a supporting surface; means mounting said transfer device for movements in an orbital path to a discharge position in which said supporting surface of said transfer device is substantially horizontal; and driving means connected to said devices for moving them in their orbital paths in unison to such positions that the support for the loaves changes from said catcher device solely to said catcher device and said transfer device jointly and thence solely to said transfer device, said driving means including means for imparting relative movement to said devices when said transfer device is in its substantially horizontal discharge position so that the supporting surface of said catcher device strips loaves off said transfer device.

16. Apparatus as set forth in claim 15 including means reacting between said transfer device and said driving means for maintaining said supporting surface on said transfer device in said substantially horizontal position during stripping of the loaves.

17. Apparatus as set forth in claim 1 including means for righting said bread tins after they are emptied of their contents and for conducting the righted bread tins away from the vicinity of said catcher device.

References Cited in the file of this patent

UNITED STATES PATENTS 2,609,944     Nicoletti _____ Sept. 9, 1952